(12) United States Patent
Penner

(10) Patent No.: US 9,828,274 B2
(45) Date of Patent: Nov. 28, 2017

(54) SLUDGE SEPARATION DEVICE AND METHOD FOR ITS USE

(76) Inventor: James Penner, Clayton, IN (US)

( * ) Notice: Subject to any disclaimer, the term of this patent is extended or adjusted under 35 U.S.C. 154(b) by 1134 days.

(21) Appl. No.: 13/038,988

(22) Filed: Mar. 2, 2011

(65) Prior Publication Data

US 2012/0223023 A1 Sep. 6, 2012

(51) Int. Cl.
*C02F 11/14* (2006.01)
(52) U.S. Cl.
CPC ..................................... *C02F 11/14* (2013.01)
(58) Field of Classification Search
CPC .............................. C02F 11/126; B01D 33/06
USPC .............................................. 210/403; 13/403
See application file for complete search history.

(56) References Cited

U.S. PATENT DOCUMENTS

| | | | | | |
|---|---|---|---|---|---|
| 3,285,416 | A | * | 11/1966 | Eltenton | B01D 17/041 210/403 |
| 4,162,149 | A | * | 7/1979 | Mekelburg | A47L 9/102 15/352 |
| 4,306,975 | A | * | 12/1981 | Siewert | 210/394 |
| 6,491,168 | B1 | * | 12/2002 | Lutz et al. | 210/402 |
| 6,702,120 | B1 | * | 3/2004 | Forslund | D21D 5/026 209/270 |
| 2007/0227956 | A1 | * | 10/2007 | Wietham | 210/136 |
| 2008/0053889 | A1 | * | 3/2008 | Leath | 210/403 |

* cited by examiner

*Primary Examiner* — Peter Keyworth
(74) *Attorney, Agent, or Firm* — Edward E. Sowers; Brannon Sowers & Cracraft PC

(57) ABSTRACT

A device for dewatering sewage sludge and a method for its use is provided. The device affords separation by causing a sludge concentrate to flow at sufficiently slow rates to cause the gel-like concentrate to fracture and release trapped water. Sewage sludge dewatered according to the method and utilizing the device can be directly burned or directly introduced into a landfill. Certain embodiments of the device can be transported to a site where the dewatering process is carried out and certain embodiments of the device can be further utilized to transport dewatered sludge from the dewatering site to a further disposal site.

25 Claims, 8 Drawing Sheets

SLUDGE SEPARATION DEVICE AND METHOD FOR ITS USE

BACKGROUND

The present invention relates to a device for dewatering sewage sludge to produce a moist friable solid substantially free of excess water and suitable for disposal without further processing and with minimal handling. The present invention further involves a method for dewatering sewage material in a single device which can be fixed or portable wherein the portable unit can optionally be utilized for both dewatering sludge and transporting the dewatered sludge to a disposal site without intermediate handling of the dewatered sludge.

Sewage sludge is a gelatinous, thixotropic semi-liquid mass removed from the liquid flow of sewage that, depending on its water content, typically behaves as a non-Newtonian fluid. The sludge will vary in amount and characteristics from different sources and with varying plant operation. Its physical properties make the pumping, dewatering, and/or handling of sludge by conventional means difficult and complicate its transportation and disposal. Sludge from primary treatment is composed of solids which can typically have a moisture content ranging from about 75 to about 95 percent. The physical handling and disposal of sewage sludge would be simplified if the solids could be more readily separated and if greater amounts of water could be readily removed. However, dewatering of sludge has proven difficult due to the nature of the substance. Dewatering sludge by conventional means, such as filtration and/or normal evaporation, is impractical because of its colloidal nature and because the water is entrapped by the molecular structure of the sludge causing the sludge to form a crust which further inhibits air drying.

The disposal of sludge presents issues related to both environmental considerations and energy consumption. Currently both land and water disposal of unprocessed sludge are widely practiced, but it is generally recognized that these methods cannot continue indefinitely. Disposal by burning has proven inefficient because today's dewatered sludge typically contains large amounts of residual water. Incineration requires enormous quantities of energy to drive off the trapped water contained by the sludge before combustion can occur. Land disposal is problematic because of the tendency of today's dewatered sludge to slowly give off (weep) additional contaminated water (excess water) once deposited at a landfill that can enter surface and ground water sources near the disposal site.

Efforts to efficiently dewater sludge by mechanical means such as vacuum filters, belt presses, centrifuges, and other mechanical devices have provided limited success. The removal of water has proven slow and inefficient. In addition, these processes require substantial capital investment and are costly to operate. The recovered, mechanically dewatered, sludge can be heat-dried, if it is to be reclaimed, but because the solids still contain large amounts of water, these further processes are also energy intensive and costly. In large communities where substantial amounts of sludge are produced and where the necessary capital costs can be supported, mechanical dewatering and incineration are more often practiced. In smaller and intermediate size communities landfill disposal and composting are practiced. Smaller communities, particularly some rural areas, often rely on the sand bed method to dewater sludge. This process is carried out by spreading the sludge over an expansive bed of sand, allowing excess water to slowly filter through the sand and/or evaporate, and after an extended period of time physically collecting the dewatered sludge along with the top layer of sand for disposal. This dewatering method is time and space intensive and has limited utility.

Each of the methods described above can be marginally improved by adding a flocculant to sludge prior to dewatering. The flocculant facilitates the build-up of colloidal materials and other small suspended particles into larger particles which are more readily separated from the sludge's water phase. Common flocculants include inorganic flocculants [e.g. poly (iron sulfate)] and polymeric anionic, cationic, nonionic, or amphoteric flocculants. Even with flocculation of the sewage sludge, equipment and handling costs are still substantial and obtaining dewatered sludge with low water content remains problematic.

What is needed is a simple, efficient, and inexpensive method for dewatering sludge to provide a friable solid free of excess water which can be efficiently incinerated without further drying, directly disposed of in landfills, and is suitable for directly composting without further treatment. Similarly, a device capable of carrying out this improved method is needed. The process utilizing this new device should minimize handling of the sludge and dewatered material and be mobile or capable of installation and operation in any size facility without excessive capital investment. The present disclosure addresses these needs and provides a novel device for conducting the disclosed method.

SUMMARY

The present disclosure provides for a dewatering device and methods for utilizing the device to dewater sewage sludge to produce a friable solid in a form that can be directly transferred to a landfill or burned without further treatment.

A first aspect of the present disclosure includes a device useful for dewatering sewage sludge which includes a vessel having (a) a horizontal axis of rotation; (b) a porous surface about the horizontal axis of rotation; (c) a nonporous region contiguous with the porous region; and (d) at least one orifice associated with the nonporous region, the at least one orifice adapted for the introduction of sludge and a flocculant and for the removal of dewatered sludge. Preferred devices are adapted to: (i) receive sludge containing water and solids, and (ii) rotate about the horizontal axis of rotation at a rate sufficiently slow to cause water to be released from the sludge and pass through the porous region, to retain solids within the vessel, and to cause the retained solids to tumble, break apart, and form a friable dewatered solid. More preferred devices include at least two orifices associated with the nonporous region. In a more preferred device, a first orifice is adapted to for the introduction of liquids including sludge and a flocculant and is positioned to allow the vessel to be filled at least in the order of about 85% of its volume with sludge before the liquid level reaches the first orifice. In the more preferred device, a second orifice is sufficiently large to allow dewatered solid to be removed and is covered with a door that can be closed affecting a seal about the orifice/door region. The second orifice/door combination is positioned to allow dewatered solids to readily pass through the orifice when the door is open and the end of the device opposite the orifice/door combination is raised. Still more preferred devices include a third orifice/door combination associated with the nonporous region. The third orifice/door combination allows for observation of sewage level during the filling process.

Additionally, devices can further includes an outer shroud having at least one exit port, the shroud substantially covering the inner porous region and providing for a region between the shroud and the inner porous region for collecting and directing water exiting to the at least one exit port. The collection of liquid exiting the device can be facilitated by positioning the device at a slight incline and causing the shroud's one or more openings to be at the device's lower end or the inner surface of the shroud can be designed to direct the liquid to a port located elsewhere as the device turns.

The vessel's inner porous region can have a pattern of voids in the surface sufficiently large to allow water to pass through the voids, but small enough to maintain flocculated solid within the vessel. Although the inner porous region can have openings with a variety of geometrical shapes and dimensions, a particularly suitable inner porous region has a pattern of narrow rectangular openings or slits having a width ranging from about 0.005 to about 0.090 of an inch. The length of the slits can vary from a fraction of an inch to several inches, and is primarily limited by its impact on the structural integrity of the porous region. Particularly suitable inner porous regions have slits having a width ranging from about 0.015 to about 0.035 of an inch and lengths ranging from a fraction of an inch up to 3-5 inches in length. Inner porous regions having openings in the form of narrow rectangular slits are capable of passing substantial amounts of liquid without plugging and can be readily cleaned with minimal rinsing.

In addition, the preferred vessel is adapted to maintain substantially atmospheric pressure within the vessel, allowing liquid to be removed substantially by gravity. As the dewatering process proceeds, viscosity of the sludge concentrate increases and eventually moist chunks of solid form and break apart, releasing additional liquid and ultimately forming a loose friable solid. Based on testing carried out at this time, preferred vessels are adapted to rotate about the horizontal axis at typically ≤ about 4 revolutions per hour, more preferably at about ≤ about 1.0 revolution per hour, and still more preferably to rotate about the horizontal axis at a rate of ≤ about 0.5 revolutions per hour. Preferred vessels have a cylindrical shape.

A still further aspect of the present disclosure includes a device for dewatering sludge comprising a cylindrical vessel having: (a) end pieces; (b) a horizontal axis of rotation through the end pieces; (c) a porous region about the horizontal axis of rotation; (d) a first orifice associated with an end piece and adapted for the introduction of sludge and a flocculant; and (e) a second orifice associated with an end piece and equipped with a covering having an open position and a closed position and adapted to remain closed during rotation and to open for the removal of dewatered sludge. In addition, the vessel is adapted to: (i) receive a sludge containing water and solids, and (ii) rotate about the horizontal axis of rotation at a rate sufficiently slow to cause water to pass through the porous region, to retain solids within the vessel, and to cause the retained solids to tumble, releasing water, and forming a friable dewatered solid. A preferred method of rotation includes a chain drive coupled with an electrical motor.

Embodiments of the device further include an outer shroud having at least one exit port, the shroud substantially covering the cylindrical vessel and providing for a region between the shroud and the vessel for collecting and directing water exiting the vessel to the at least one exit port.

A device of this disclosure can be portable or can operate at a fixed location. One portable embodiment includes a device removably mounted or fixed on the bed of a truck or related vehicle having a dump bed, transported to a site where the dewatering process occurs, and transported to a disposal site where the dewatered solid is emptied from the device by activating the dump bed.

The preferred device further includes a shroud which covers a portion of the cylindrical vessel or the entire cylindrical vessel for collecting the water exiting through the inner porous surface and directing the water to an exit port within the shroud. Preferred devices further include a surface member for removal of dewatered solid, the surface member having the form of either a hinged door or a removable end-piece located at the end of the cylindrical vessel. Preferred devices further have one or more openings about the circumference of the shroud to allow for separated liquid collected by the shroud to exit and be collected. The collection of liquid can be facilitated by positioning the device at a slight incline causing the shroud's one or more openings to be at the device's lower end or the inner surface of the shroud can be designed to direct the liquid to a port located elsewhere as the device turns.

A still further aspect of the present disclosure involves a method for dewatering sewage sludge which includes the steps of (a) providing a colloidal mixture of sludge in water; (b) adding the colloidal mixture and a flocculant, with mixing, to a vessel having a horizontal axis of rotation and a porous surface about the horizontal axis of rotation; and (c) rotating the vessel about the horizontal axis of rotation at a rate of ≤ about 4 revolutions per hour, wherein the rotating causes the water to be released from the sludge and pass through the porous surface to initially produce a moist solid that tumbles and crumbles inside the vessel producing a dewatered solid suitable for disposal without further treatment. For preferred methods, the vessel is rotated at a rate of ≤ about 1 revolution per hour, whereas for the most preferred methods, the vessel is rotated at a rate of ≤ about 0.5 revolutions per hour. Processing the sludge at this slow rate of rotation causes ruptures in the thick mass releasing water, provides sufficient time for gravity to remove substantial amounts of free water, and causes the remaining solid to undergo a slow tumbling action. The slow tumbling action causes the solid to move up the porous region in the direction of rotation and fall back onto the solid or porous surface below in a type of rolling motion. Chunks of solid continue to break up into smaller pieces as the process continues, disrupting any skin formation about the chunk and further releasing more liquid. When carried out as a batch process, 20,000 to 26,000 gallons of sewage sludge can generally be dewatered within about 8-12 hours in a vessel having a capacity of about 6,000 gallons.

DESCRIPTION

Figure 1:
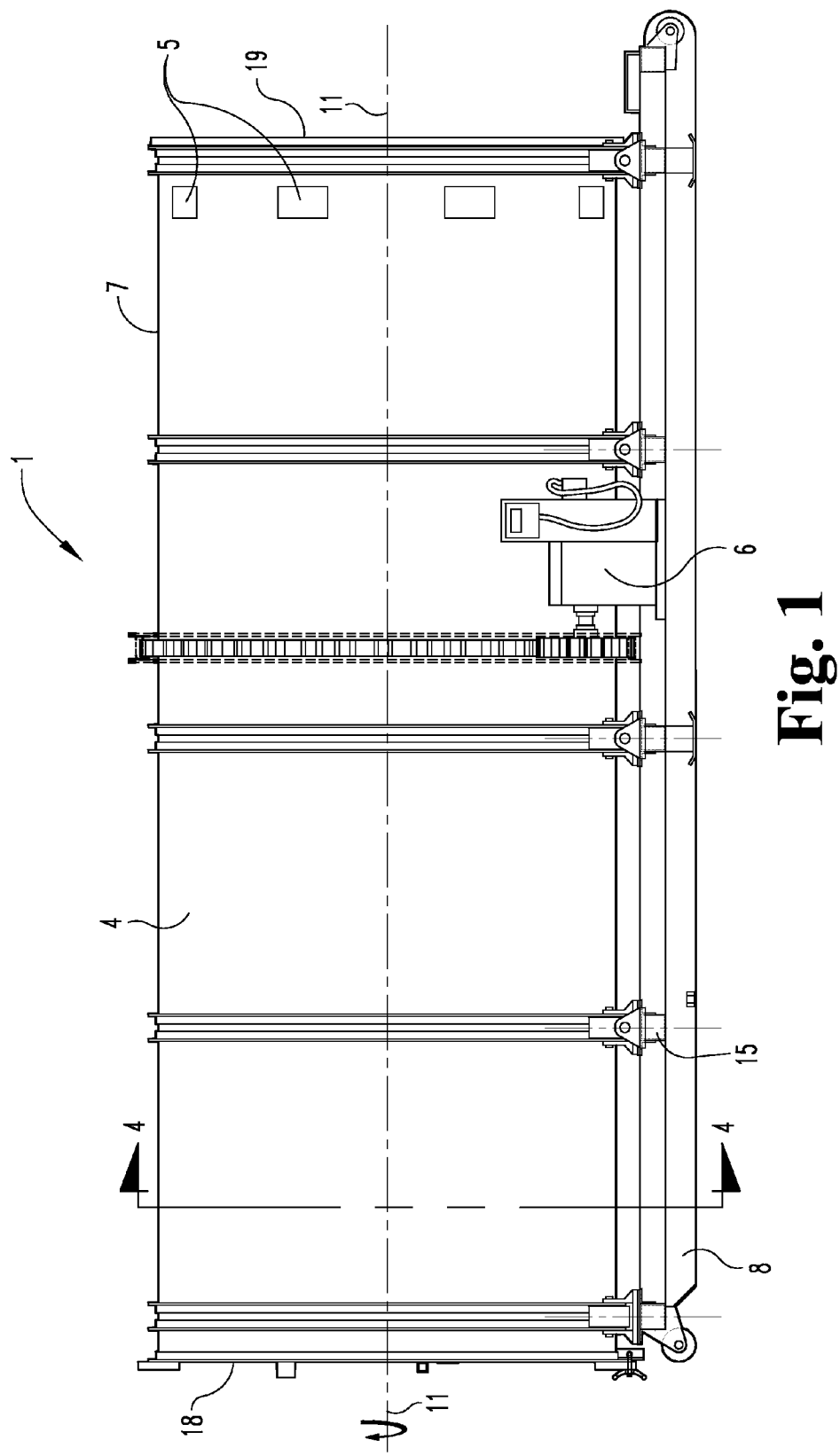
FIG. 1 provides a side view of a cylindrical device for dewatering sewage sludge.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. As used herein, the terms "sludge" and "sewage" are sometimes used interchangeably herein and "excess water" refers to the liquid that, with time, spontaneously separates from a source of incompletely dewatered sludge to form a liquid phase about the solid sludge.

The Device

A first aspect of the present disclosure involves a device for dewatering sewage sludge to provide a liquid portion and an isolated solid portion free of excess water and suitable for disposal or utilization without further workup. Certain embodiments of the device can be installed or positioned at a location or site or can be mobile such as a unit which can be positioned on a truck bed or other mobile unit, such as for example a trailer bet. Such mobile units allow the device to service multiple locations or sites and optionally utilized to transport dewatered solid to another site for disposal or utilization. Preferred vessel/truck combinations involve truck-bed mounts including a dump bed to facilitate removal of dewatered sludge from the vessel.

In the discussion that follows, positions of applicant's device are described in regard to the positions of numerals on a conventional clock face, such as a 6:00 position or a 12:00 position. This terminology is intended to assist a reader in understanding a particular figure, and the terminology is not intended to limit in any way, the breadth of applicant's disclosure.

FIG. 1 provides a side view of a cylindrical device 1 for dewatering sewage sludge. Device 1 includes a frame 8 designed to support other device components and to enable the device to be loaded onto the bed or a truck or otherwise moved. Device 1 further includes vessel 4, adapted to receive sludge and rotate about a horizontal axis of rotation 11. Frame 8 can also support a drive mechanism 6 for causing vessel 4 to rotate about its horizontal axis of rotation 11. The cylindrical vessel 4 includes an inner porous surface (See FIG. 4) and an outer nonporous region or shroud 7 for collecting and directing the flow of water from the device and for accepting a rotational force exerted by the drive mechanism 6 to cause the device to rotate about its horizontal axis of rotation 11. Rollers 15 are mounted onto frame 8 to support shroud 7 and allow rotation thereof. A plurality of exit ports 5 are located about the circumference of shroud 7 to allow water to exit as vessel 4 rotates about its horizontal axis of rotation.

Figure 2:
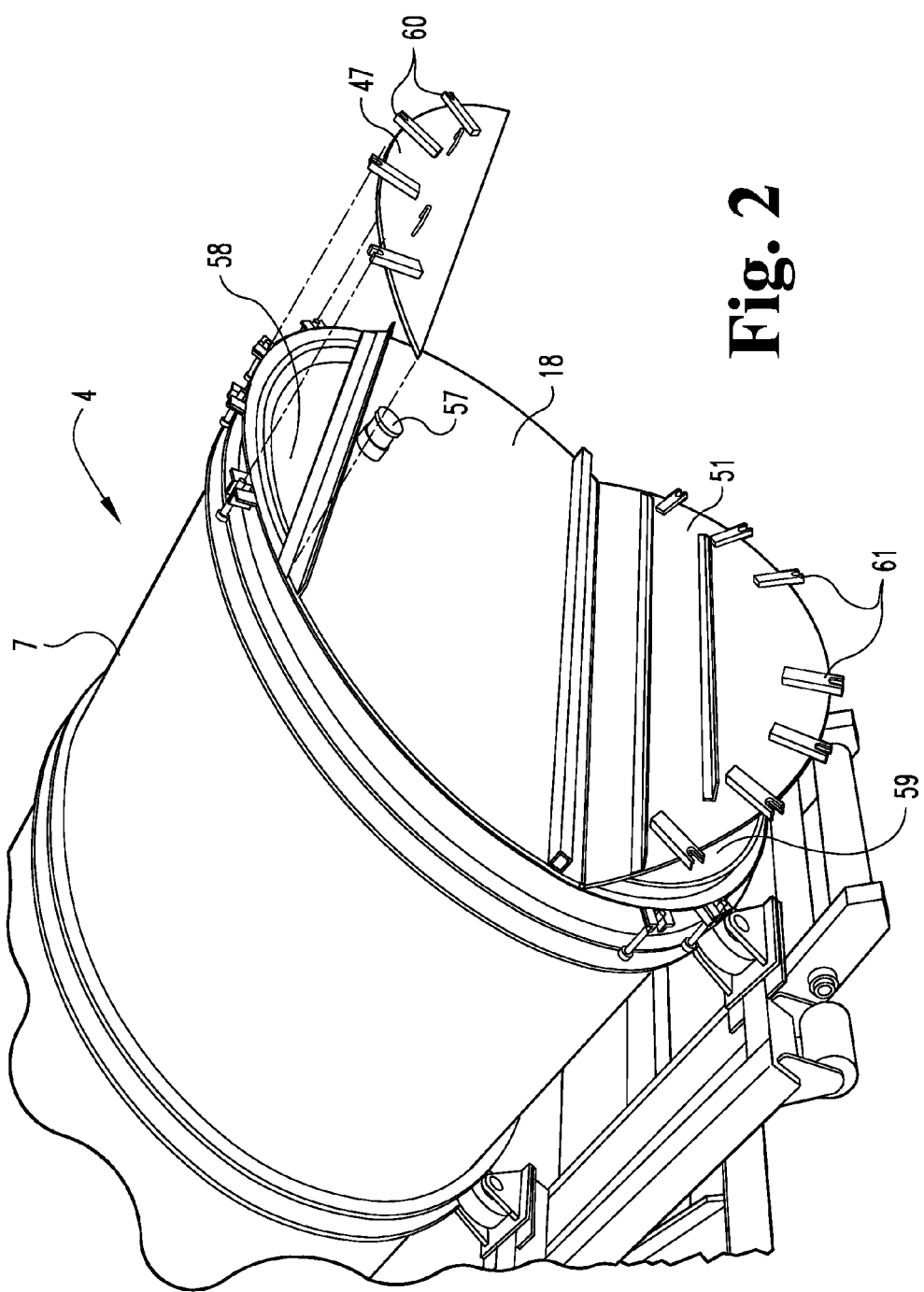
FIG. 2 provides an elevation view of a cylindrical vessel utilized for a sludge dewatering device.

FIG. 2 provides an elevation view of a cylindrical vessel 4 for dewatering sewage sludge. Vessel 4 includes an inner porous surface or region 21 (See FIG. 4) and an outer shroud 7. Nonporous regions or end pieces 18 and 19 (See FIG. 1) connect the two ends of shroud 7 and inner porous surface or region 21 (See FIG. 4). Although endpiece 18 only requires a single opening or orifice for loading and unloading vessel 4, preferred end piece 18 includes openings or orifices 57 (for filling), 58 (for viewing), and 59 (for unloading) with openings 58 and 59 having hinged doors 47 (for viewing) and 51 (for unloading dewatered solid). Gaskets (not shown) provide a seal when hinged doors 47 and 51 are closed. A preferred location for opening or orifice 57 is near the circumference of end piece 18 just below viewing door 47 to allow liquid sludge to be loaded to a level just below opening or orifice 59 and viewing door 47. Opening 59 can be fitted with a cap after loading has been accomplished.

A preferred configuration for end piece 18 for loading sludge into vessel 4, is accomplished by rotating vessel 4 to position wherein: a) orifice 59 is closed and sealed with door 51 and positioned at an approximately 6:00 position; and b) orifice 58 is open for viewing and positioned at an approximately 12:00 position. Once an appropriate amount of sludge has been loaded through orifice 57 to a desired level, orifice 57 is capped, and door 47 is closed and sealed, vessel 4 can be rotated at a rate sufficient to dewater the loaded sewage sludge. Doors 47 and 51 can be maintained in a closed position with latches 60 and 61 or other means.

Figure 3:
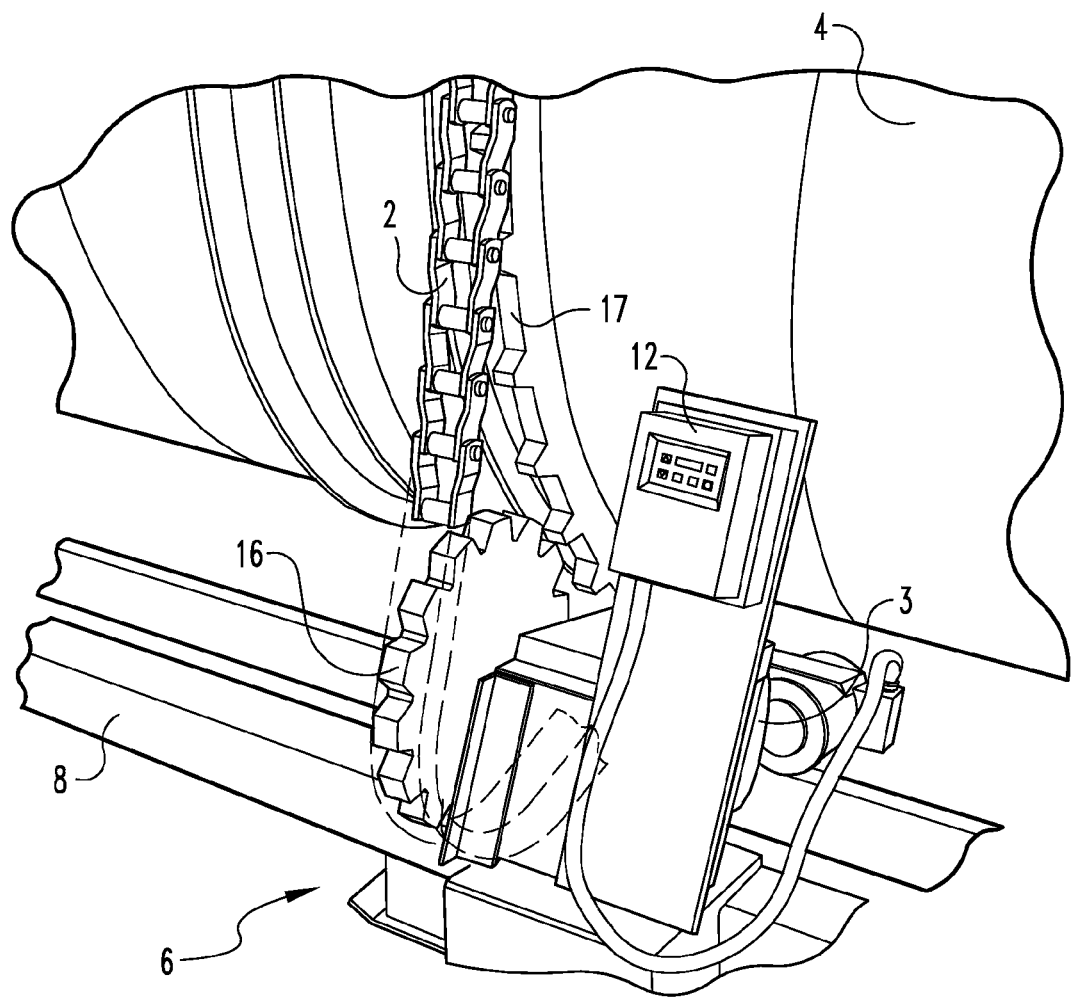
FIG. 3 illustrates a preferred drive mechanism for a dewatering device.

FIG. 3 illustrates a preferred drive mechanism 6 including a motor 3 and a first sprocket 16 mounted on frame 8 and a second sprocket 17 positioned about the device's circumference in line with sprocket 16. A chain 2 is in communication with sprockets 16 and 17 in order to cause vessel 4 to rotate when the motor 3 is activated. Preferred motors 3 are electrical motors having a variable speed controller 12 to properly control the rate of rotation for vessel 4.

Figure 4:
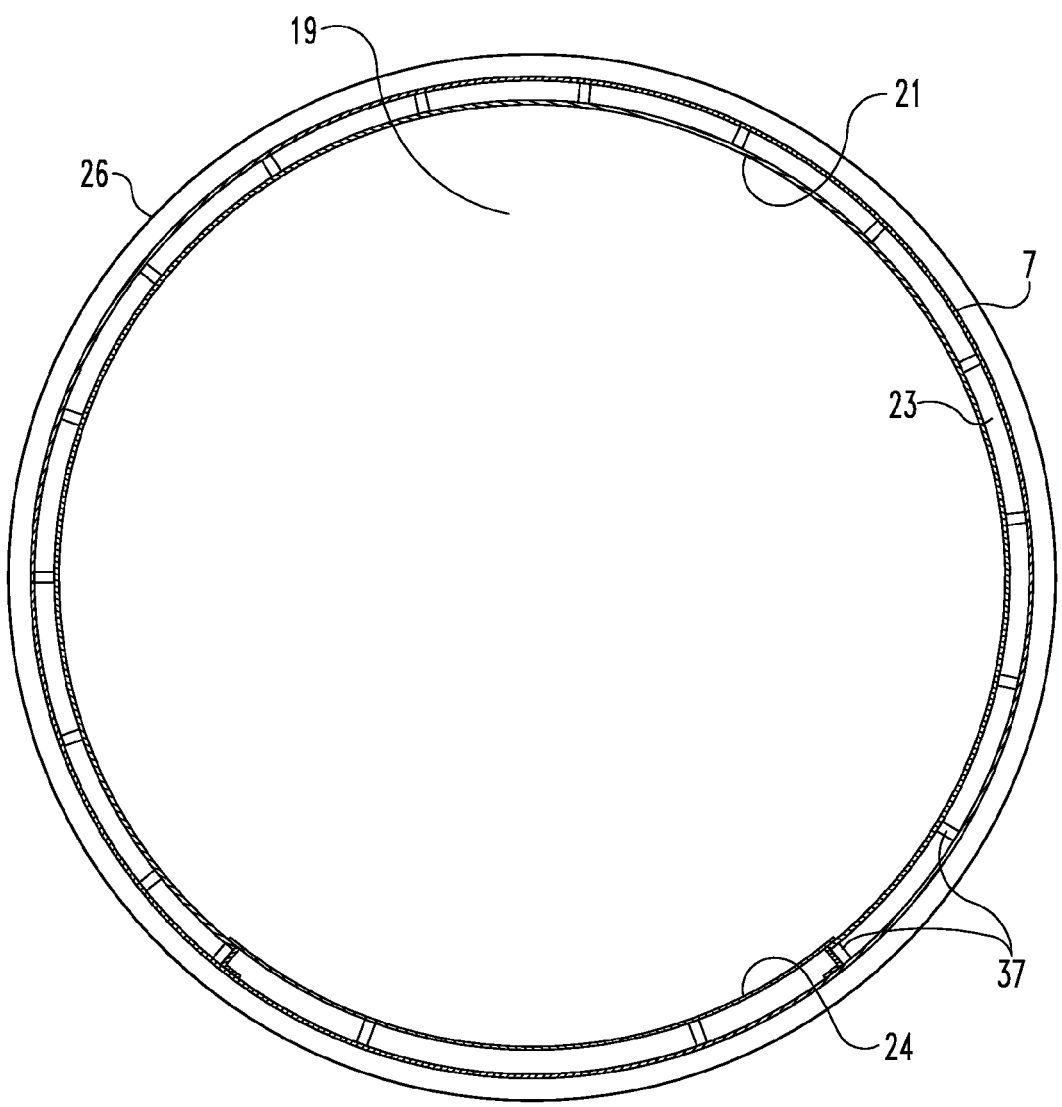
FIG. 4 provides a sectional view of the cylindrical device of FIG. 1 along the line indicated in FIG. 1.

FIG. 4 provides a sectional view along lines noted in FIG. 1, illustrating end piece 19, the inner porous surface or region 21, shroud 7, and a collection region 23 for water exiting the inner porous surface to collect. Water from collection region 23 can exit through exit ports 5 in shroud 7 (See FIG. 1). An optional nonporous region 24 (See FIG. 5A) can be utilized along a portion of the inner porous surface or region 21 to provide a nonporous surface for receiving sludge entering vessel 4. When vessel 4 is in a loading position, the optional nonporous region 24 typically spans from about 5:00 to about 7:00. The utilization of the optional nonporous region 24 minimizes the plugging of the lower part of the nonporous region caused by a slurry containing solids impacting that surface with sufficient force to cause solids to partially penetrate openings within the porous surface and facilitates cleaning of the inner porous surface between dewatering processes. Flange 26 illustrated in FIG. 4 provides a track for rollers 15 (See FIG. 1).

Figure 5A:
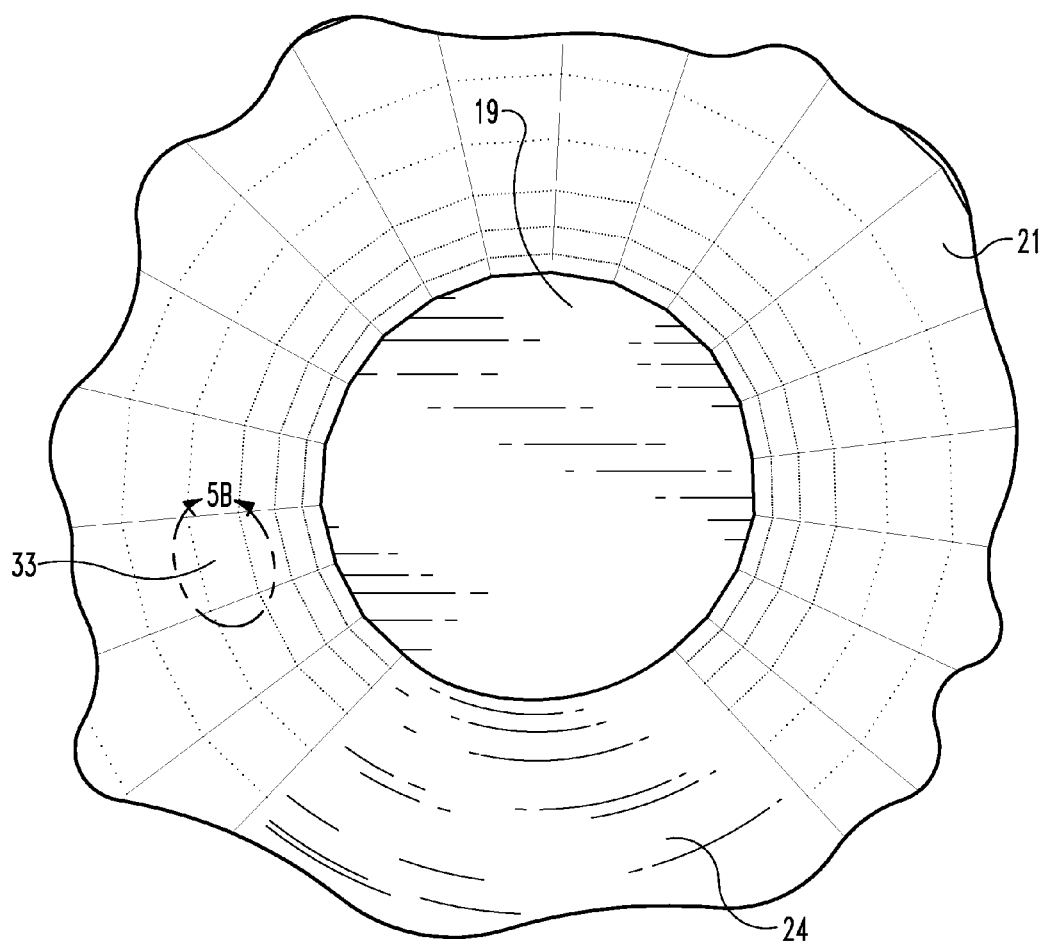
FIG. 5A provides an elevation view of the inner porous surface component for a dewatering device composed of rectangular components having rectangular slits therein.
Figure 5B:
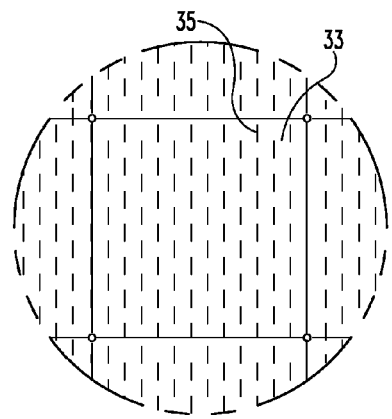
FIG. 5B provides a view of a rectangular component of the inner porous surface of a dewatering device.

FIG. 5A provides an elevation view of the inner porous surface or region 21 constructed from interlocking rectangular components 33 having a pattern of rectangular slits 35 therein (See FIG. 5B). Although the interlocking rectangular blocks 33, illustrated in FIG. 5B can be planar or curved, if planar, they collectively approximate an inner curved surface. The inner porous surface can also be constructed from interlocking rectangular blocks appropriately curved to provide a more exact inner curved surface. Similarly, the inner curved surface can have a unitary construction containing an appropriate level and configuration of openings.

FIG. 5B provides a view of a rectangular component 33 including one pattern of rectangular slits 35.

Figure 5C:
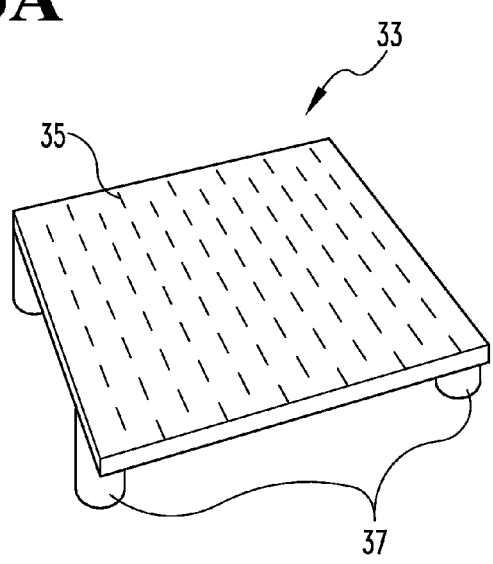
FIG. 5C provides an elevation view of the rectangular component illustrated in FIG. 5B.

FIG. 5C provides an elevation view of a typical rectangular component 33 (shown in FIG. 5B) illustrating legs 37 that serve as spacers between the surface of 33 and the inner surface of the shroud 7. Collection region 23 (See FIG. 4) is formed between the lower surface of 33 and shroud 7 and around legs 37. Separate spacers can be used with rectangular components lacking legs or with a unitary porous surface, otherwise lacking corresponding leg components. Preferred rectangular components 33 are made from polymeric materials. One such polymeric material includes "DELRIN", a polyoxymethylene (acetal). Additional information regarding the polyoxymethylene (acetal) utilized can be found in ASTM Specifications, D-4181-92a, POM111. "DELRIN" is a registered trademark of E. I. du Pont de Nemours & Company, Wilmington, Del. 19898.

Figure 6:
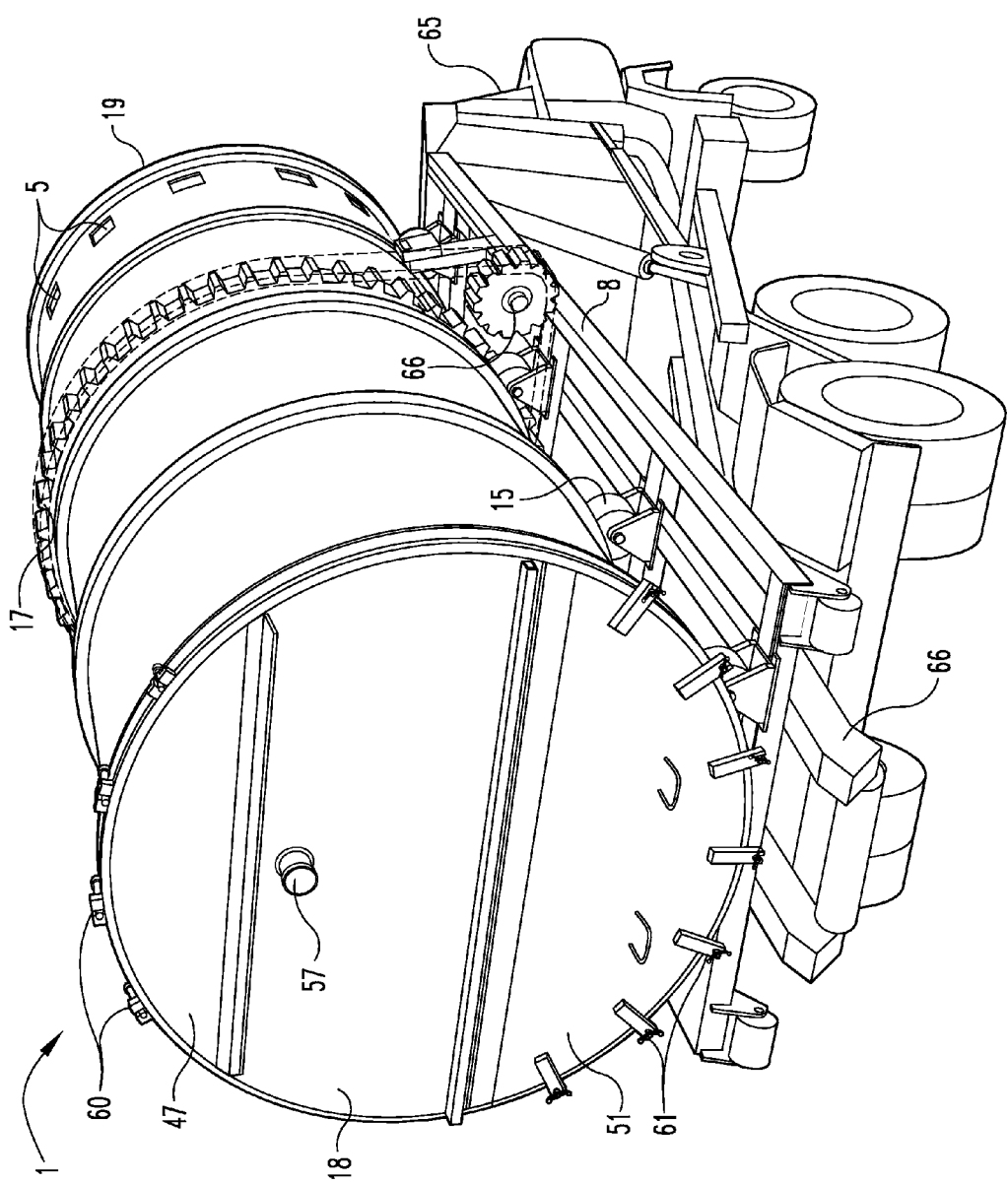
FIG. 6 provides an illustration of a dewatering device mounted on the bed of a truck to allow transportation of the device to a site where sewage sludge is generated and for delivering dewatered sludge within the device to a disposal site.

FIG. 6 provides an illustration of device 1 mounted on a dump bed 66 of a truck 65. Device 1, loaded in this manner can be moved to a remote site to carry out a dewatering process, and can, after a dewatering process has been completed, be transported to a disposal site where the dewatered solid can be dumped, as illustrated in FIG. 7.

Figure 7:
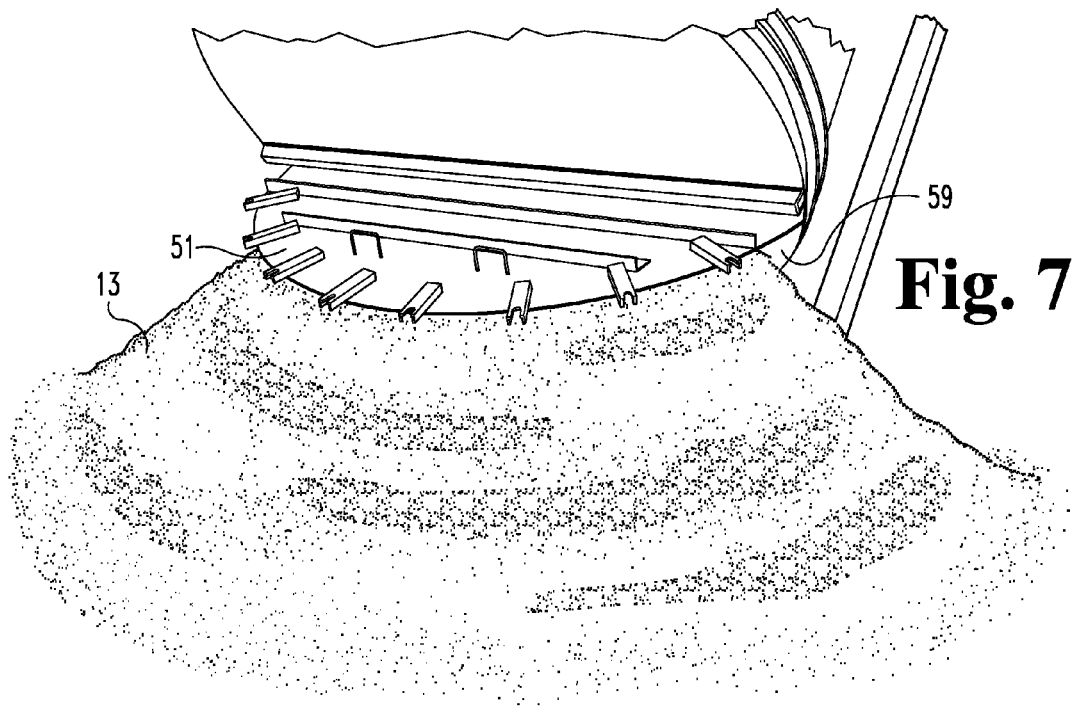
FIG. 7 provides an illustration of the truck mounted device of FIG. 6 unloading dewatered sludge.

FIG. 7 illustrates the device mounted on a truck bed as provided in FIG. 6, unloading dewatered sludge 13 through orifice 59 and open door 51.

Figure 8:
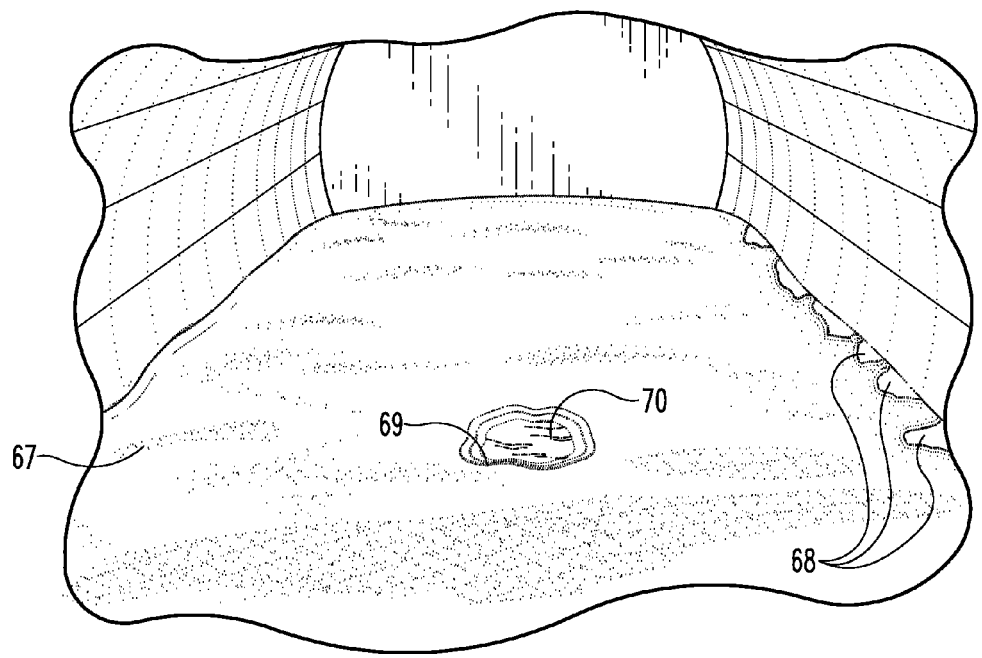
FIG. 8 provides an illustration of the upper surface of concentrated sludge inside of a dewatering device after the material's surface has been fractured with a tool and after rotation of the device has commenced.

FIG. 8 provides an illustration of the upper surface of the sludge concentrate 67 (Example 1) as seen through viewing orifice 58 (FIG. 2). Depression 69 containing separated water 70 resulted from briefly poking the surface with a shovel. Shortly after rotation was initiated in a clockwise direction at a rate of about 0.5 revolutions per hour, the upper region of the concentrated sludge slowly flowed in the direction of rotation causing fractures 68 to continually form along the inner porous surface and release substantial amounts of water to the inner porous surface. As rotation continued, some fractures continued, some fractures collapsed, and new fractures formed.

Figure 9:
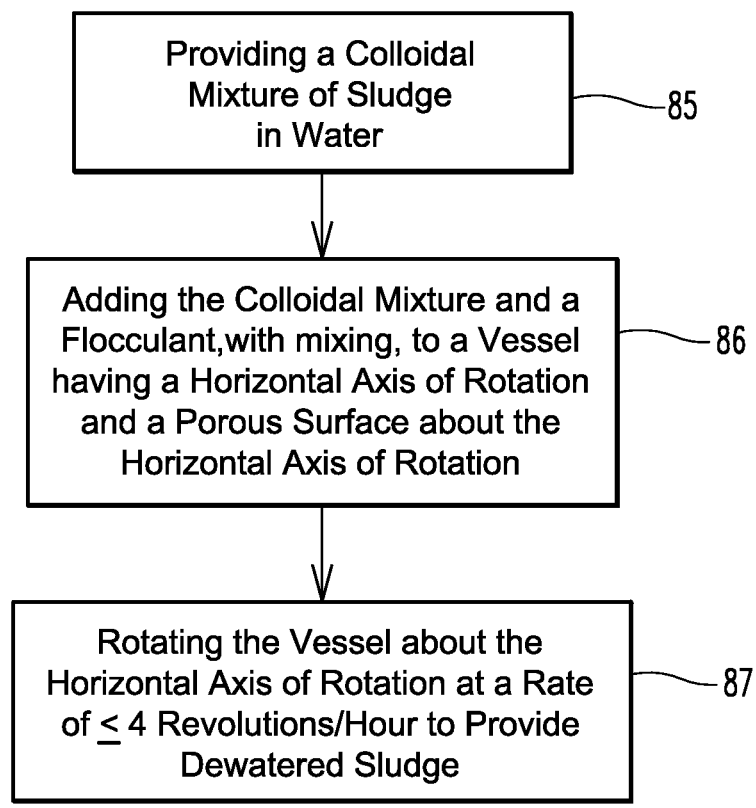
FIG. 9 provides a schematic diagram of the steps in the dewatering method disclosed.

FIG. 9 provides a schematic diagram of the dewatering method described below. The method includes providing a colloidal mixture of sludge in water, 85; adding the colloidal mixture and a flocculant, with mixing, to a vessel having a horizontal axis of rotation and a porous surface about the horizontal axis of rotation 86; and rotating the vessel about the horizontal axis of rotation at a rate of ≤ about 4 revolutions per hour 87, to dewater the sludge. A preferred device for the dewatering process is illustrated in FIGS. 1-8 above.

The Method

Sludge from primary treatment is composed of solids which can typically have a water content ranging from about 75 to about 95 percent. Upon flocculation, approximately the first 60-80% of the water present can be readily removed by gravity filtration to provide a thick partially dewatered sludge or sludge concentrate. This partially dewatered sewage sludge or sludge concentrate is typically a gelatinous, thixotropic semi-liquid mass that behaves as a non-Newtonian fluid having pseudoplastic properties that defies further gravity filtration. The present study has demonstrated that the sludge resists releasing further water when static and/or when subjected to moderate to high shear rates. When subjected to low shear rates, the sludge appears brittle and fractures. Gently poking the surface with a sharp object typically causes a surface fracture in the form of a depression wherein free water collects. Causing the partially dewatered sludge or gel to flow very slowly, proximate a porous surface similarly causes fractures to form along the gel/porous surface interface, releasing water to the porous surface in the same way that surface disruption does. Because of its thixotropic nature, causing the gel to flow at faster rates or otherwise subjecting it to higher shear rates appears to reduce the material's viscosity, makes the sludge more fluid, reducing its brittleness, and interferes with the formation of fractures and the release of water. The precise flow-rate or shear rate where this transition occurs varies with the nature of the sludge and the device utilized to affect the controlled flow and removal of released water.

Based on this observation, one aspect of this disclosure involves a method for dewatering sewage sludge by providing a source of sludge material, concentrating the sludge material to form a partially dewatered sludge having a gel-like structure, causing the partially dewatered sludge to flow proximate a porous surface at a sufficiently slow rate at ambient pressure to cause the sludge to form defined fractures proximate the porous surface and to release water from the fractures. Continued processing according to this method can ultimately provide a moist friable solid suitable for disposal without further treatment. Water released from the fractures passes through the porous surface and is collected. Suitable flow rates result in the formation of fractures within the gel and the release of water. By monitoring the development of fractures and the release of water at different flow rates, a maximum suitable flow rate can be readily determined without undue experimentation. Unsuitable flow rates in excess of the maximum suitable flow rate result in shear thinning of the gel material, failure to form fractures, and failure to release water. Unsuitable flow rates can similarly be determined without undue experimentation. The device described above, when appropriately operated, has proven efficient in dewatering sewage sludge according to this method.

A further aspect of this present disclosure involves a method for dewatering sewage sludge that involves providing a colloidal mixture of sludge in water; adding the colloidal mixture and a flocculant, with mixing, to a vessel having a horizontal axis of rotation and a porous surface about the horizontal axis of rotation; and rotating the vessel about the horizontal axis of rotation at a rate of ≤ about 4 revolutions per hour, wherein the rotating causes the water to be released and pass through the porous surface and produce a moist dewatered solid suitable for disposal without further treatment.

A variety of inorganic flocculants, organic flocculants and combinations thereof can be utilized to coagulate the solids contained in sewage sludge. Organic flocculants can be cationic, anionic, nonionic, and amphoteric in nature. Suitable flocculants can be screened by mixing a flocculant or combination of flocculants with raw sewage sludge, shaking the mixture, and allowing the mixture to stand undisturbed for about 30 minutes or less. Based on testing conducted thus far, a cationic flocculant derived from a polyacrylamide is preferred. More preferred are polyamide cationic flocculants selected from the group consisting of HYDROFLOC™ 748E, 748 B7, 750B, 750E, 750X, 714B, 714E, and 782. A most preferred cationic polyamide cationic flocculant is HYDROFLOC™ 748 B7. The HYDROFLOC™ cationic polymers are available from the Aqua Ben Corporation, 1390 N. Manzanita St. Orange, Calif. 92867. HYDROFLOC is a common law trademark owned by the Aqua Ben Corporation, 1390 N. Manzanita St. Orange, Calif. 92867.

Although excess amounts of flocculants can be utilized, based on experiments carried out thus far, the use of at least about 1 pound of flocculant for each 300 gallons of sewage sludge achieves at least some coagulation of solids. More preferably at least about 1 pound of flocculant for each 200 gallons of sewage sludge is utilized. Of course the specific amount of flocculant needed will vary, depending on the efficiency of the flocculant and the source and the nature of the sewage sludge. The optimum amount needed can be determined by one skilled in the art without undue experimentation.

The sewage sludge and flocculant can be added to the vessel as separate streams, as a single stream combined and mixed in route to the vessel or from a separate container where the sludge and flocculant have been combined and mixed prior to transferring to the vessel. Based on work carried out thus far, adding and mixing the sludge and flocculant on the way to the vessel minimizes the amount of equipment needed and has been preferred. Upon adding the sludge/flocculant combination to the vessel, water spontaneously passes through the porous surface with or without rotation of the vessel leaving behind a partially dewatered material having a gel-like structure that generally resists the release of additional water.

Further dewatering of the partially dewatered sewage sludge can be accomplished by slowly rotating the contents of the device at a rate sufficiently slow to cause the sludge mass to slowly flow in the direction of rotation, to form fractures proximate the device's porous surface and thereby release water. For the device described above, rates of rotation of ≤4 revolutions per hour have been utilized, whereas rates of rotation of ≤1 revolution per hour have been preferred and rotations rates of ≤0.5 revolutions per hour have been most preferred.

Rotating the vessel can be carried out in a variety of ways. For example rotation can be in a clockwise direction or a counterclockwise direction or can involve intermittent rotation. The direction is not critical provided that rotation is generally slow and is carried out in a manner that causes the vessel's contents to slowly move toward a porous surface. This process of rotating the vessel allows for a periodic cleaning of the opposite inner porous surface causing that surface region to be generally free from the build-up of solids, and continually exposes a fresh region of the porous surface to facilitate effective removal of separated liquid. For the preferred device illustrated in FIGS. 1-8, the direction of rotation for vessel 4 (See FIG. 1) should be in the direction that requires the chain to have a downward pull toward the sprocket 16 (See FIG. 3).

The resulting solid obtained from the dewatering step is typically a friable solid having a water content ranging from about 50 to about 65 wt. %. The solid can be removed from the vessel and transported for disposal or it can be transported in the vessel and be removed at the disposal site. The resulting flocculated solid can be directly disposed of in a landfill, directly composted, or burned without further treatment. Related objects and advantages of the present invention will be apparent from the following description.

The following examples are intended to be illustrative and are not intended to limit the present disclosure in any way.

Example 1

Approximately 24,000 gallons of sewage sludge was dewatered in a device illustrated in FIGS. 1-8, having a volume of about 6,000 gallons. A cationic flocculant, HYDROFLOC™ 748B, was combined, in line, with the sludge at a rate of about 100 pounds of flocculant for each 18,000 gallons of sludge. The combined stream of sludge and flocculant was pumped into the vessel through orifice 57, (FIG. 6) without rotation of the vessel. During the addition of the sludge/flocculant combination, clear water, free of particulates, rapidly flowed through the inner porous surface of the stationary vessel and through orifices 5 in the vessel's shroud 7 (FIGS. 1 and 6), allowing the vessel to be filled with in the order of about 4 times its volume of sludge. As the vessel filled, flow from the vessel ultimately slowed and stopped leaving a thick gelatinous mass of solid and water within the vessel. The resulting mass of solid and water exhibited gel-like properties. Upon disrupting the mass's surface with a blunt object, a fracture in the form of a depression formed in the surface and was quickly filled with clear water (See FIG. 8). Upon rotating the vessel at rate of about 0.5 revolutions per hour, the upper layer of gelatinous material slowly began to flow in the direction of rotation (toward the side moving downward). As the gelatinous material came in contact with a fresh region of the porous surface, a large number of substantially V- and W-shaped fractures developed proximate and contiguous with the outer porous surface releasing substantial amounts of water to and through the porous surface. With continued rotation, the development of the fractures and the release of water continued until chunks of wet solid having a range of sizes were left. As rotation continued, the larger chunks of wet solid ruptured releasing more water to the porous surface to ultimately provide a friable moist solid substantially devoid of any free water. A sample of the moist dewatered solid was weighed and dried to a constant weight. The solid obtained had a moisture content of 58 weight %.

The device containing dewatered sludge was loaded onto a truck bed having a front hydraulic lift and transported to a landfill where the solid was removed through orifice 59 and disposed of in compliance with current regulatory requirements (See FIG. 7). The resulting solid was also suitable for disposal by composting or by incineration.

The HYDROFLOC™ 748B is a polyacrylamide cationic polymer available from the Aqua Ben Corporation, 1390 N. Manzanita St., Orange Calif. 92867.

Example 2

The procedure described in Example 1 was repeated with one change. Upon receiving the flocculated sludge, the vessel was rotated at a rate of about 5 revolutions per hour, instead of the previous rate of 0.5 revolutions per hour. At this faster rate of rotation the formation of fractures proximate the porous surface was prevented and dewatering failed to occur. The material that remained after continued rotation was not suitable for disposal in a land fill, by composting or by incineration.

Examples 3-19

The method of Example 1 can be repeated to provide similar results with other polyacrylamide cationic polymers (flocculants) also available from the Aqua Ben Corporation. These flocculants included HYDROFLOC™ 748E, 750B, 750E, 750X, 714B, 714E, and 782.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method for dewatering sewage sludge comprising:
   (a) providing a colloidal mixture of sludge in water;
   (b) adding the colloidal mixture and a flocculant, with mixing, to a vessel having:
      (i) an outer circumference;
      (ii) a horizontal axis of rotation;
      (iii) an inner porous region positioned about the horizontal axis of rotation wherein the porous region has first and second ends;
      (iv) first and second nonporous end pieces positioned at first and second ends of the porous region;
      (v) a first orifice associated with the first end piece for the introduction of sludge and a flocculant and for the removal of dewatered sludge; and
      (vi) a drive mechanism positioned between the first and second end pieces in contact with the vessel's outer circumference between the end pieces capable of causing continued rotation of the vessel at a rate of ≤ about 4 revolutions per hour; and
   (c) rotating the vessel about the horizontal axis of rotation to cause the water to pass through the porous surface to initially produce a moist solid that tumbles and crumbles inside the vessel producing a dewatered solid suitable for disposal without further treatment.

2. The method of claim 1, wherein rotating the vessel about the horizontal axis of rotation involves rotating the vessel in a continuous single direction.

3. The method of claim 1, wherein rotating the vessel about the horizontal axis of rotation involves rotating the vessel in a single direction in a discontinuous manner.

4. The method of claim 1, wherein rotating the vessel about the horizontal axis of rotation involves causing the vessel to rotate at a rate of ≤ about 2 revolution per hour.

5. The method of claim 4, wherein rotating the vessel about the horizontal axis of rotation involves causing the vessel to rotate at a rate of ≤ about 0.5 revolutions per hour.

6. The method of claim 1, wherein the method further includes the additional step of transporting the dewatered solid to disposal site in the vessel.

7. A method for dewatering sludge comprising:
   (a) providing a colloidal mixture of sewage sludge and water;
   (b) adding the colloidal mixture and a flocculant to a vessel having:
      (i) a cylindrical porous region having first and second ends and an outer shroud;
      (ii) first and second end pieces positioned at the first and second ends of the porous region;
      (iii) a horizontal axis of rotation through the first and second end pieces;
      (iv) a first orifice associated with the first end piece and equipped with a covering having an open position and a closed position and adapted to remain closed during rotation and to open for the introduction of sludge and flocculant and for the removal of dewatered sludge; and
      (v) a drive mechanism positioned midway between the first and second end pieces in contact with the shroud's outer circumference capable of causing rotation of the vessel about its horizontal axis of rotation at a rate of ≤ about 1 revolutions per hour: and
   (c) concentrating the sludge to form a sludge concentrate;
   (d) rotating the vessel about the horizontal axis of rotation at a rate sufficiently slow to cause the sludge concentrate to fracture, to release water and to form a dewatered solid, suitable for immediate disposal.

8. The method of claim 7, wherein rotating the vessel about the horizontal axis involves rotating the vessel at a rate of ≤ about 2 revolutions per hour.

9. The method of claim 8, wherein rotating the vessel about the horizontal axis involves rotating the vessel at a rate of ≤ about 0.5 revolutions per hour.

10. The method of claim 7, wherein adding the colloidal mixture and a flocculant involves combining and mixing the colloidal mixture and the flocculant during the adding step.

11. The method of claim 7, wherein adding the colloidal mixture and a flocculant involves combining and mixing the colloidal mixture and the flocculant prior to the adding step.

12. A device for dewatering sludge comprising a vessel having:
    (a) an outer circumference;
    (b) a horizontal axis of rotation;
    (c) an inner porous region positioned about the horizontal axis of rotation wherein the porous region has first and second ends;
    (d) first and second nonporous end pieces positioned at first and second ends of the porous region;
    (e) a first orifice associated with the first end piece for the introduction of sludge and a flocculant and for the removal of dewatered sludge; and
    (f) a drive mechanism positioned between the first and second end pieces in contact with the vessel's outer circumference between the end pieces to cause continued rotation of the vessel at a rate of ≤ about 4 revolutions per hour.

13. The device of claim 12, further comprising a surface member covering the first orifice, the surface member having an open position and a closed position and adapted to remain closed during rotation and to open for the removal of dewatered sludge from the vessel.

14. The device of claim 13, further comprising a second orifice associated with the first or second end piece and adapted for the introduction of liquids including the sludge and the flocculant.

15. The device of claim 14, wherein the drive mechanism rotates the vessel at a rate of ≤ about 1 revolutions per hour.

16. The device of claim 15, wherein the vessel has a cylindrical shape.

17. The device of claim 16 wherein the vessel further includes an outer shroud having at least one exit port, the shroud substantially covering the vessel, adapted to rotate with the cylindrical vessel and providing for a region between the shroud and the porous region for collecting and directing water exiting the vessel to the at least one exit port.

18. The device of claim 16, wherein the drive mechanism includes a motor, a first gear attached to the motor, a second gear about the circumference of the vessel, and a chain between the first and second gears.

19. The device of claim 12, wherein the porous region includes narrow rectangular slits having a width ranging from about 0.005 to about 0.090 of an inch.

20. The device of claim 12, wherein the device is mobile, having rollers to assist in loading onto a truck and unloading from a truck for transportation to sites for dewatering sewage sludge and/or to disposal sites for disposal of dewatered sewage sludge.

21. A device for dewatering sludge comprising a vessel having:
 (a) a cylindrical porous region having first and second ends and an outer shroud;
 (b) first and second end pieces positioned at the first and second ends of the porous region;
 (c) a horizontal axis of rotation through the first and second end pieces;
 (d) a first orifice associated with the first end piece and equipped with a covering having an open position and a closed position and adapted to remain closed during rotation and to open for the introduction of sludge and flocculant and for the removal of dewatered sludge; and
 (e) a drive mechanism positioned midway between the first and second end pieces in contact with the shroud's outer circumference to cause continued rotation of the vessel about its horizontal axis of rotation at a rate of ≤ about 1.0 revolutions per hour.

22. The device of claim 21 wherein the outer shroud, in contact with the first and second end pieces, includes at least one exit port, substantially covers the cylindrical porous region, is adapted to rotate with the vessel, and provides for a region between the shroud and the cylindrical porous region for collecting and directing water exiting the vessel to the at least one exit port.

23. The device of claim 22, wherein the cylindrical porous region includes narrow rectangular slits having a width ranging from about 0.005 to about 0.090 of an inch.

24. The device of claim 23, wherein the drive mechanism positioned midway between the first and second end pieces in contact with the shroud's outer circumference causes rotation of the vessel about its horizontal axis of rotation of ≤ about 0.5 revolutions per hour.

25. The device of claim 21, wherein the device has rollers for moving and loading onto the bed of a mobile vehicle and transporting to sites for dewatering and for sludge disposal.

* * * * *